US006859091B1

(12) United States Patent
Nicholson et al.

(10) Patent No.: US 6,859,091 B1
(45) Date of Patent: Feb. 22, 2005

(54) CONTINUOUS LINEAR REGULATED ZERO DROPOUT CHARGE PUMP WITH HIGH EFFICIENCY LOAD PREDICTIVE CLOCKING SCHEME

(75) Inventors: Richard Nicholson, Thurxton (GB); Simon Churchill, Whitchurch (GB)

(73) Assignee: Maxim Integrated Products, Inc., Sunnyvale, CA (US)

( * ) Notice: Subject to any disclaimer, the term of this patent is extended or adjusted under 35 U.S.C. 154(b) by 0 days.

(21) Appl. No.: 10/666,397

(22) Filed: Sep. 18, 2003

(51) Int. Cl.$^7$ ................................................ G05F 1/10
(52) U.S. Cl. ........................................................ 327/536
(58) Field of Search ................................ 327/530, 534, 327/535, 536, 537, 538, 540, 541, 543

(56) References Cited

U.S. PATENT DOCUMENTS

| | | | |
|---|---|---|---|
| 5,877,948 A | 3/1999 | Dijkmans | |
| 6,002,630 A | 12/1999 | Chuang et al. | |
| 6,115,272 A | 9/2000 | Pasternak | |
| 6,169,444 B1 | 1/2001 | Thurber, Jr. | |
| 6,188,520 B1 | 2/2001 | Huang | |
| 6,300,820 B1 | 10/2001 | Fotouhi et al. | |
| 6,310,789 B1 | 10/2001 | Nebrigic et al. | |
| 6,400,211 B1 * | 6/2002 | Yokomizo et al. | 327/536 |
| 6,531,912 B2 * | 3/2003 | Katou | 327/536 |
| 6,556,069 B1 * | 4/2003 | Casier et al. | 327/540 |
| 6,717,458 B1 * | 4/2004 | Potanin | 327/536 |

OTHER PUBLICATIONS

Dickson, John F., "On–Chip High–Voltage Generation in MNOS Integrated Circuits Using an Improved Voltage Multiplier Technique", IEEE Journal of Solid–State Circuits, Jun. 1976, vol. SC–11, No. 3, pp. 374–378.

* cited by examiner

Primary Examiner—Jeffrey Zweizig
(74) Attorney, Agent, or Firm—Blakely, Sokoloff, Taylor & Zafman LLP

(57) ABSTRACT

Continuous linear regulated zero dropout charge pump with high efficiency load predictive clocking scheme AND method. The method of pumping charge includes amplifying the difference between a feedback signal from the charge pump output and a reference, and alternately switching between: a) coupling a first flying capacitor between first and second power supply terminals, and coupling a second flying capacitor between the amplified difference and the charge pump output; and b), coupling the second flying capacitor between first and second power supply terminals, and coupling the first flying capacitor between the amplified difference and the charge pump output. Preferably the switching is done before the amplifier saturates. Various alternate embodiments and method and apparatus for starting the charge pump are described.

34 Claims, 10 Drawing Sheets

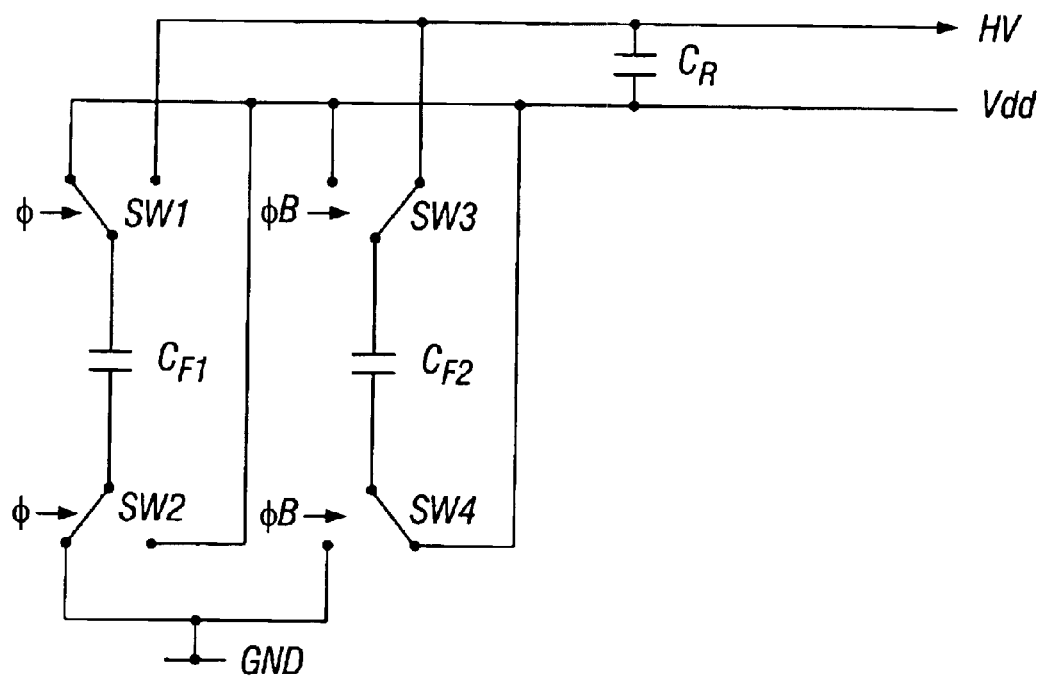
FIG. 2A
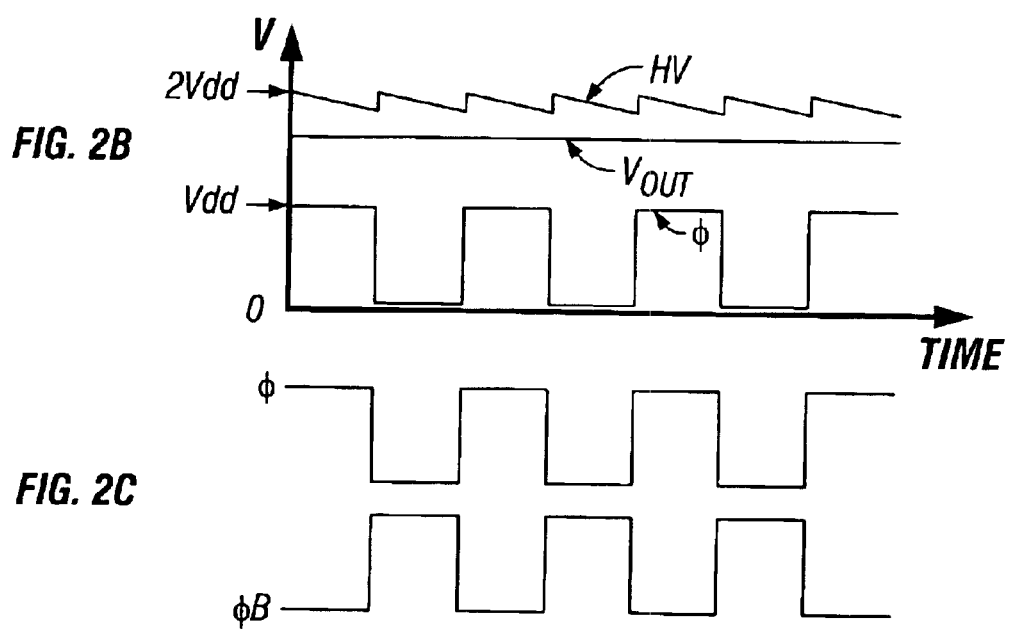
FIG. 2B
FIG. 2C

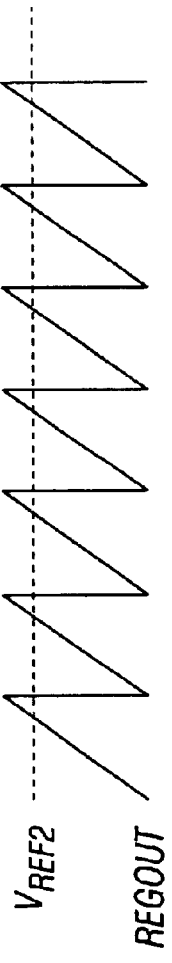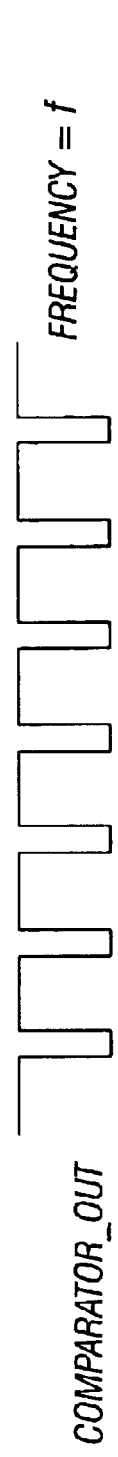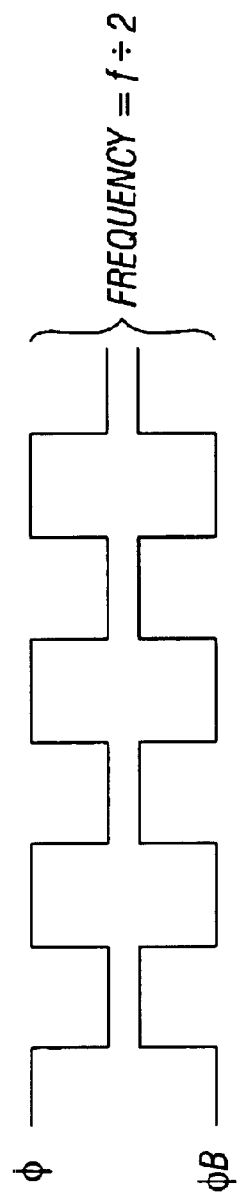
FIG. 4B
FIG. 4C
FIG. 4D

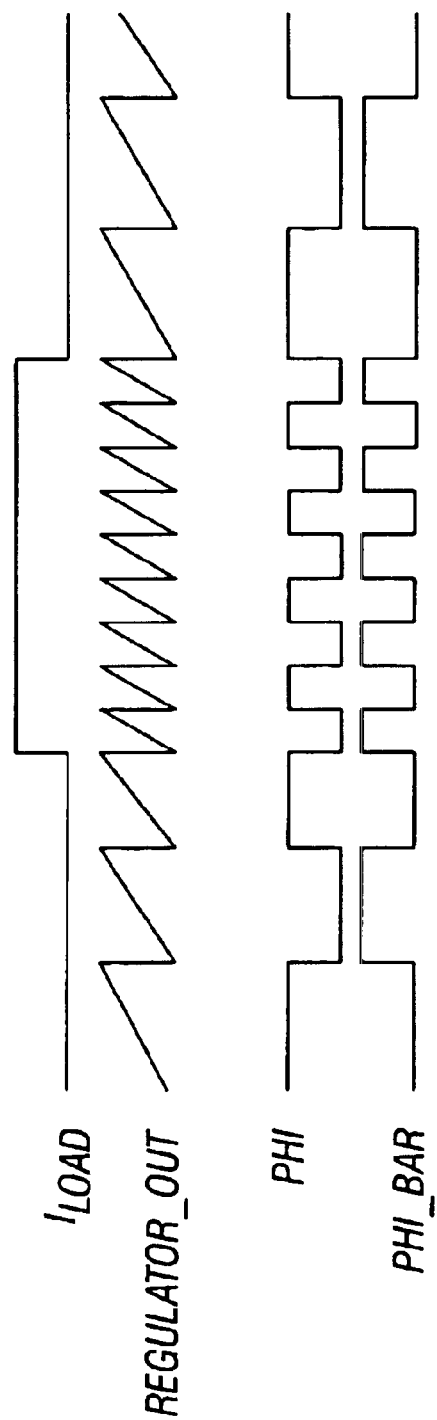

CONTINUOUS LINEAR REGULATED ZERO DROPOUT CHARGE PUMP WITH HIGH EFFICIENCY LOAD PREDICTIVE CLOCKING SCHEME

BACKGROUND OF THE INVENTION

1. Field of the Invention

The present invention relates to the field of charge pumps.

2. Prior Art

Charge pumps are used to generate voltages beyond the supply rails (primary power source) of a system. In integrated circuit (IC) design, they are especially used in non-volatile memory technologies where very large voltages, compared to the input supply voltages, are required for programming and erase. They are also used in analog circuits to derive negative voltage supplies (allowing the IC only to require a positive connection to the outside world) and to derive large voltages locally when the IC is to be used in an especially low voltage system (e.g. a battery powered system). In digital circuits, charge pumps are sometimes used to reduce the supply voltage (and hence supply current) in certain high-activity areas of the IC and to derive negative voltages for biasing substrates in order to reduce leakage currents. Those skilled in the art will recognize that these examples are just examples, and that the potential uses for charge pumps are considerably wider and more varied than presented here. Furthermore, the following descriptions are intended to be considered from the point of view of implementation on an integrated circuit, although those skilled in the art will recognize that the invention is not limited to integrated circuit implementation.

FIG. 1a shows the basic components of a prior art charge pump. One of ordinary skill in the art will appreciate that there are other basic configurations of charge pumps, and that the scheme of FIG. 1a is used by way of example only, and is in no way limiting of the scope of the present invention to this general charge pump structure. As shown in FIG. 1a, a 'flying capacitor' $C_F$, under the control of clock signal $\Phi$ (FIG. 1b) controlling switches SW1 and SW2, is alternately connected between Vdd and Gnd (the system power supplies), and Vdd and node HV. The capacitor $C_R$ coupled between HV and Vdd is known as a 'reservoir' capacitor and, over many oscillations of $\Phi$, becomes charged to Vdd. Hence, with no load current $I_{LOAD}$, node HV charges to a potential of 2Vdd with respect to node Gnd. It will be appreciated by those with ordinary skill in the art that many charge pump stages like that of FIG. 1a or of older designs can be cascaded to achieve output voltages in excess of 2Vdd.

Generally, some load current, $I_{LOAD}$, is present on node HV. This causes a 'sawtooth' waveform (FIG. 1c) of amplitude $V_{RIPPLE}$ on node HV as the charge on capacitor $C_R$ is continuously removed by the load, yet is replenished only periodically from the flying capacitor. The average output voltage, $V_{AVERAGE}$, is therefore load dependant and something less than the maximum achievable 2Vdd. This ripple is usually undesirable, and can be minimized by several approaches:

1. For a given load current, increasing the size of the reservoir capacitor $C_R$ proportionally decreases the ripple, but also proportionally increases both the area ($C_R$ is generally by far the largest component in such a charge pump) and the turn-on time (number of cycles of $\Phi$ required to initially charge node HV to its target voltage of 2Vdd).

2. It is very common to attempt to provide a more continuous supply of charge from the flying capacitor. This can be achieved for instance, as shown in FIG. 2a, by splitting the flying capacitor into two devices with switches SW1 through SW4 driven by clock phases 180 degrees apart (depicted as $\Phi$ and $\Phi B$ in FIG. 2c). Still the output HV contains substantial ripple, as shown in FIG. 2b. Clearly, if capacitor $C_F$ were split into an infinite number of devices driven by an infinite set of clocks phase shifted from $\Phi$ by 0° to 360°, then the ripple would be zero. However, note that as the number of flying capacitors is increased, so does the number of switches. Complexity in the clock generation circuits and the inefficiency introduced by manipulating the switches prevents more than a very few phase-shifted flying capacitors being used.

Another approach is to regulate the output voltage in some way. Many regulator designs are well known in the art, such as disclosed in U.S. Pat. No. 5,877,948. FIG. 2d shows a prior art double flying-capacitor system like that of FIG. 2a, but further including an output regulator. Without exception, all such regulator designs require HV to be at a higher potential than Vout (see FIG. 2b). This immediately introduces significant inefficiency in the pump design. Furthermore, it means that the maximum useable voltage at the output HV must be lower than the maximum voltage permitted by the breakdown of the fabrication process. As breakdown voltages are becoming smaller and smaller with decreasing process geometries, this can be a significant disadvantage.

Returning to FIG. 2a, consider the nature of the clocks $\Phi$ and $\Phi B$. There are several different possibilities:

1. Continuous frequency, amplitude =Vdd. In this scheme (the simplest scheme), if the load current is constant, an average voltage will result at node HV such that the average charge removed from the capacitor $C_R$ by the load in time $\Delta t$ is equal to the average charge supplied by the flying capacitors $C_{F1}$ and $C_{F2}$ in the same time period $\Delta t$. This is an open loop system. If the load current changes, the output voltage at node HV responds to compensate and keep the above equality true. Therefore, higher load currents reduce the voltage at HV, lower load currents increase it. Similarly, changes in the supply voltage Vdd directly affect the achieved output voltage. For varying loads, this is a very inefficient approach, yet is very common (see Dickson, IEEE Journal of Solid State Circuits, Vol SC-11, No. 3, June 1976, pp 374–378). Often, a voltage sensitive current clamp (e.g. zener diode) is used to regulate the output of such a charge pump by dumping the excess current supplied by the charge pump, resulting in a very low efficiency.

2. Continuous frequency, amplitude <Vdd. In this scheme, a reference voltage is used instead of Vdd to ensure that the amplitude of the clocking signal is independent of Vdd. This ensures that the output voltage at node HV is independent of supply voltage variations, but it is still sensitive to load current variations as described in technique 1 above.

3. Continuous frequency, variable amplitude. Here, an indicative circuit parameter is monitored and the amplitude of the clocking waveforms modulated accordingly to maintain a constant voltage at node HV. Typically, the voltage on node HV is monitored itself (see U.S. Pat. No. 6,300,820), although other parameters can be observed (see U.S. Pat. No. 6,002,630).

4. Variable frequency, fixed amplitude. Here, an indicative circuit parameter is monitored and the frequency of the clocking waveforms modulated accordingly to maintain a constant voltage at node HV. Typically, once again, the voltage on node HV is monitored (see U.S. Pat. Nos. 6,115,272 and 6,310,789,).

5. Variable frequency, variable amplitude. Techniques 3 and 4 above can be combined, as demonstrated in U.S. Pat. No. 6,188,590.

BRIEF DESCRIPTION OF THE DRAWINGS

FIGS. 2a, 2b and 2c illustrate another prior art charge pump, and output and clocking waveforms for that prior art charge pump, respectively.

FIGS. 4a, 4b, 4c and 4d illustrate a charge pump in accordance with another embodiment of the present invention, and associated voltage waveforms for the outputs of the regulator amplifier and the comparator, and clocking waveforms, respectively.

FIGS. 5a, 5b and 5c present a circuit diagram for an embodiment of the present invention, and waveforms for the regulator amplifier output and clocking waveforms, respectively, illustrating among other things, the response of the circuit to step changes in load current.

DETAILED DESCRIPTION OF PREFERRED EMBODIMENTS

Figure 1A:
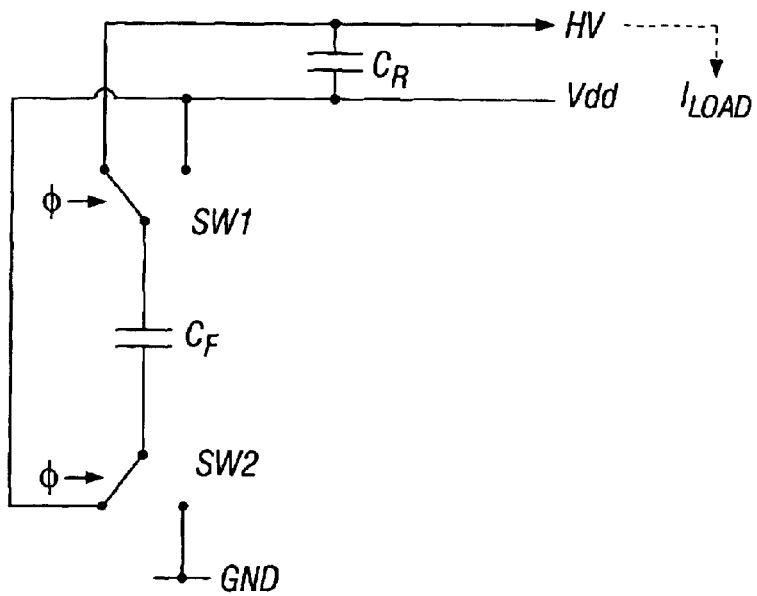
FIGS. 1a, 1b and 1c illustrate a prior art charge pump and clocking and output waveforms for that prior art charge pump, respectively.
Figure 1B:
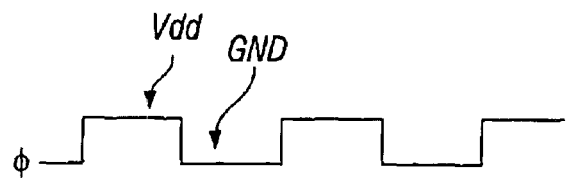
Figure 1C:
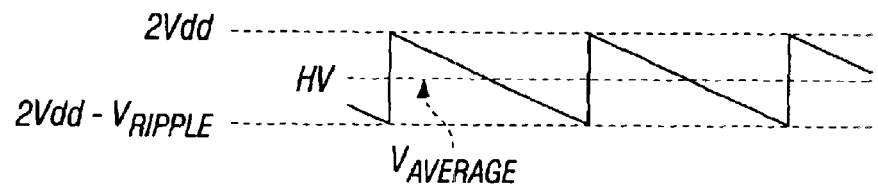
Figure 2D:
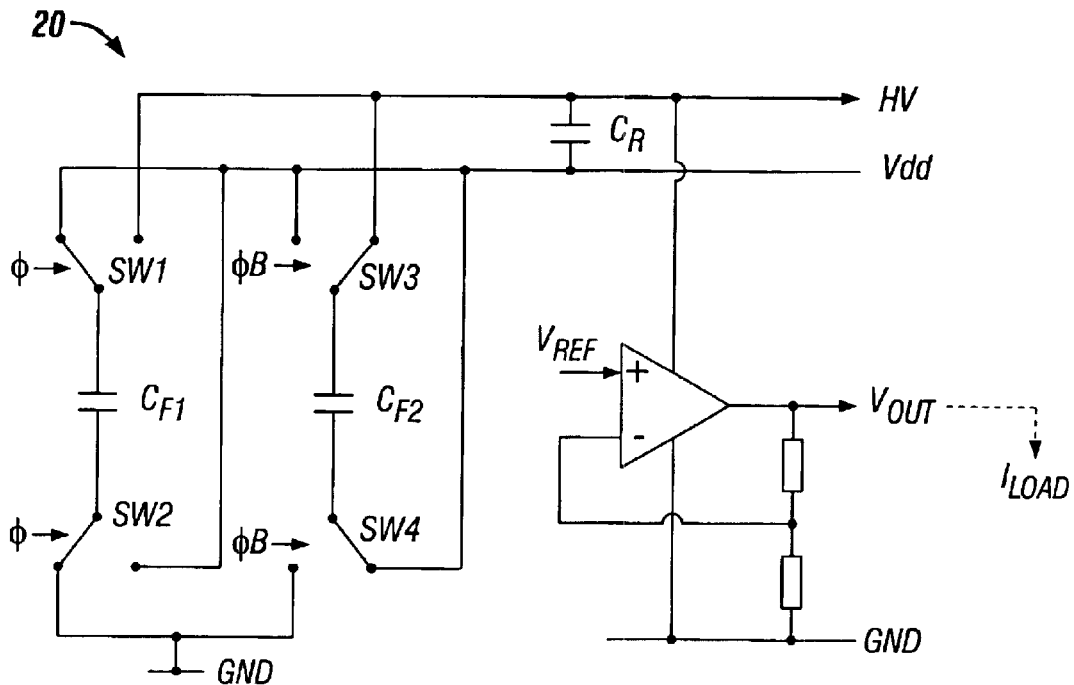
FIG. 2d illustrates the charge pump of FIG. 2a, further including a linear voltage regulator incorporated into the charge pump output.
Figure 3A:
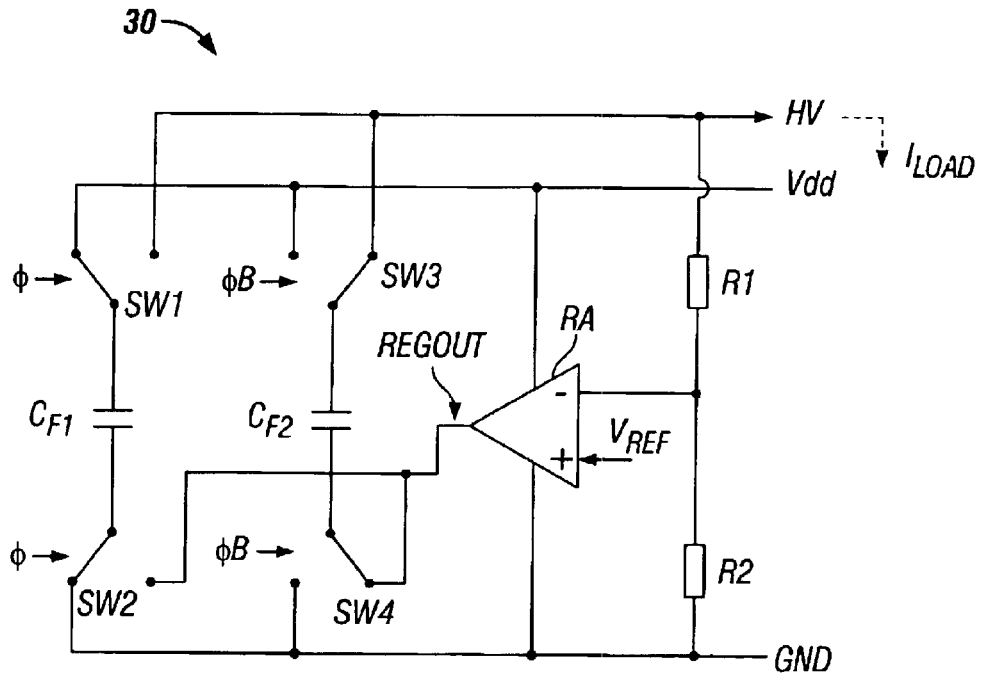
FIGS. 3a, 3b and 3c illustrate a charge pump in accordance with one embodiment of the present invention, and clocking and an internal node voltage waveforms for the prior charge pump, respectively.
Figure 3C:
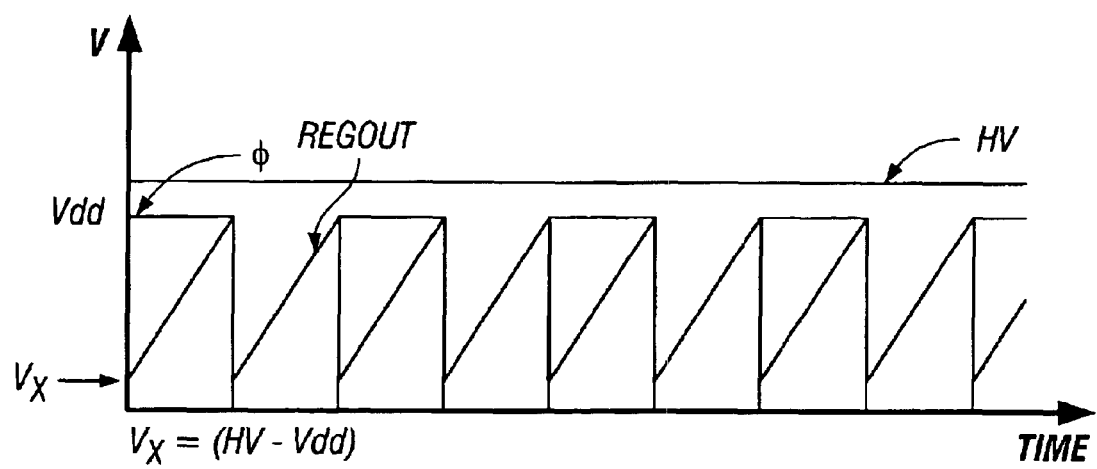
Figure 3B:
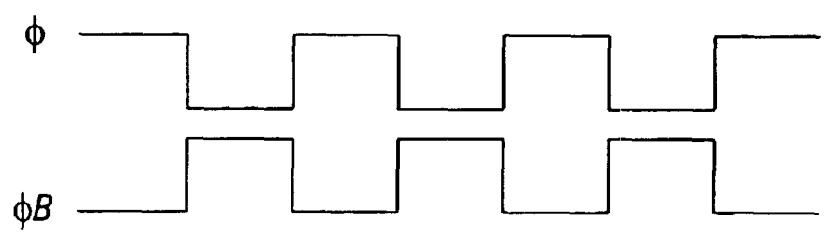

The first aspect of the present invention is a scheme for voltage regulation that allows the regulated pump output voltage to be the highest voltage in the charge pump, i.e., the regulator has zero dropout. Referring to FIGS. 3a through 3c illustrating a first preferred embodiment of the invention, the clock signals $\Phi$ and $\Phi B$ are still present, and at the top, the flying capacitors $C_{F1}$ and $C_{F2}$ are connected in the same way as in FIG. 2a. At the bottom of flying capacitors $C_{F1}$ and $C_{F2}$, rather than being connected selectively between GND and Vdd as in FIG. 2a, the capacitors are selectively connected between Gnd and the output node (REGOUT) of a regulator amplifier RA. Thus switches SW1 through SW4 alternately switch the flying capacitors between Vdd and GND, and HV and the voltage on the node REGOUT in an interleaved manner.

The voltage divider (resistors R1 and R2), the regulator amplifier RA and the applicable flying capacitor ($C_{F1}$ or $C_{F2}$, depending on which capacitor is then connected between the output REGOUT of the regulator amplifier RA), form a closed loop to regulate HV. This is a continuous, linear regulation loop from the output of the regulator amplifier, via one (or the other) of the flying capacitors to the output node, then through the shunt divider back to the input of the regulator amplifier. Thus, rather than the bottom of the capacitors being instantaneously switched to Vdd, the voltage on the bottom of the capacitors is varied from the voltage $V_x$ (see FIG. 3c) to approximately Vdd (nearly the full range of the output of the regulator amplifier) in a gradual manner as commanded by the regulator amplifier to maintain the differential input to the regulator amplifier (preferably a high gain amplifier) substantially at zero volts. The result is a gradually increasing voltage on the bottom terminal of the each flying capacitor as charge is removed from the node HV to maintain the regulated output HV, much like a linear regulator would. The regulated voltage is:

$HV = V\text{ref}(R1+R2)/R2$

The rate of increase in the voltage of node REGOUT is:

$$\frac{d(REGOUT)}{dt} = \frac{I_{load} + HV/(R1+R2)}{C_f}$$

where: $C_f$ is the capacitance of the respective flying capacitor

When the voltage REGOUT approaches Vdd, the switches SW1 through SW4 switch. Now the flying capacitor that was coupled to the output HV is coupled between Vdd and GND for recharging, and the other, now charged, flying capacitor is coupled between the voltage of node REGOUT and the output HV. The linear regulating loop quickly adjusts, with the voltage of node REGOUT rapidly dropping to the voltage $V_x$, and increasing at whatever rate is required to provide the required load current to maintain regulation. (Details of a preferred method for automatic switching of the switches SW1 through SW4 will be subsequently described.)

Note the lack of a reservoir capacitor $C_R$ in this design. Although in practice a small capacitor is often required to remove glitches coming from feedthrough of the $\Phi$ and $\Phi B$ signals, theoretically no reservoir capacitor is required in this design. Clearly a smaller reservoir capacitor may be used than in many prior art designs, and the load may itself have adequate capacitance provided for noise suppression or other reasons.

FIGS. 3b and 3c present representative waveforms for the complimentary clock signals $\Phi$ and $\Phi B$ and for the voltage on the node REGOUT. HV in a voltage boost pump can be any voltage greater than Vdd and less than 2Vdd, the available load current for any given charge pump decreasing as the regulation voltage is set closer to 2Vdd. When being charged, each flying capacitor will be charged to a voltage of Vdd–GND. When each flying capacitor is switched to the active state, the voltage on node REGOUT will drop to the voltage $V_x$, where $V_x$=GND+(HV–Vdd), so that the voltage on the top of the respective flying capacitor will be HV. From that lower voltage, the voltage on node REGOUT will increase at the rate required to supply the load current at the regulated voltage until being switched to be recharged and the other, now charged flying capacitor is switched to the active state. When switched, the voltage on node REGOUT again rapidly drops and starts upward again, creating the sawtooth waveform of FIG. 3C.

In FIG. 3C, the voltage on node REGOUT is shown as rising substantially to Vdd before the flying capacitors are switched. Since the slope of the sawtooth waveform is load dependent, the frequency or repetition rate of the sawtooth waveform will be substantially proportional to the load current (including the voltage divider current requirements). FIG. 3c also implies the use of a clocking scheme (flying capacitor switching scheme) like the one to be subsequently described. However, it should be noted that clocking could occur at any higher rate, up to the maximum at which the circuit will still properly operate. Clocking at a higher rate for a given load current will not change the slope of the sawtooth waveform, but will cause the peaks of the sawtooth waveform to be reduced because of the earlier flying capacitor switching. Various exemplary representative clocking schemes of this type are described later.

As pointed out before, there is a continuous linear regulation loop from the output of the regulator amplifier, via a flying capacitor to the output node, then through the shunt divider back to regulator amplifier. This loop is momentarily broken during flying capacitor changes, but apart from this brief switching period, the output node is always under the control of the regulator. Consequently, this loop may be stabilized for the pump load using any number of techniques for pole/zero placement, as are well known in the art.

Note that continuous linear regulation is a very significant advancement from the invention presented in U.S. Pat. No. 6,300,820. Such a continuous linear loop allows regulation of frequencies well beyond the clocking frequency (limited only by the bandwidth of the loop), including the aforementioned sawtooth characteristic, and works equally well from low switching frequencies to high switching frequencies, as no averaging over several clock periods is required for regulation.

Figure 4A:
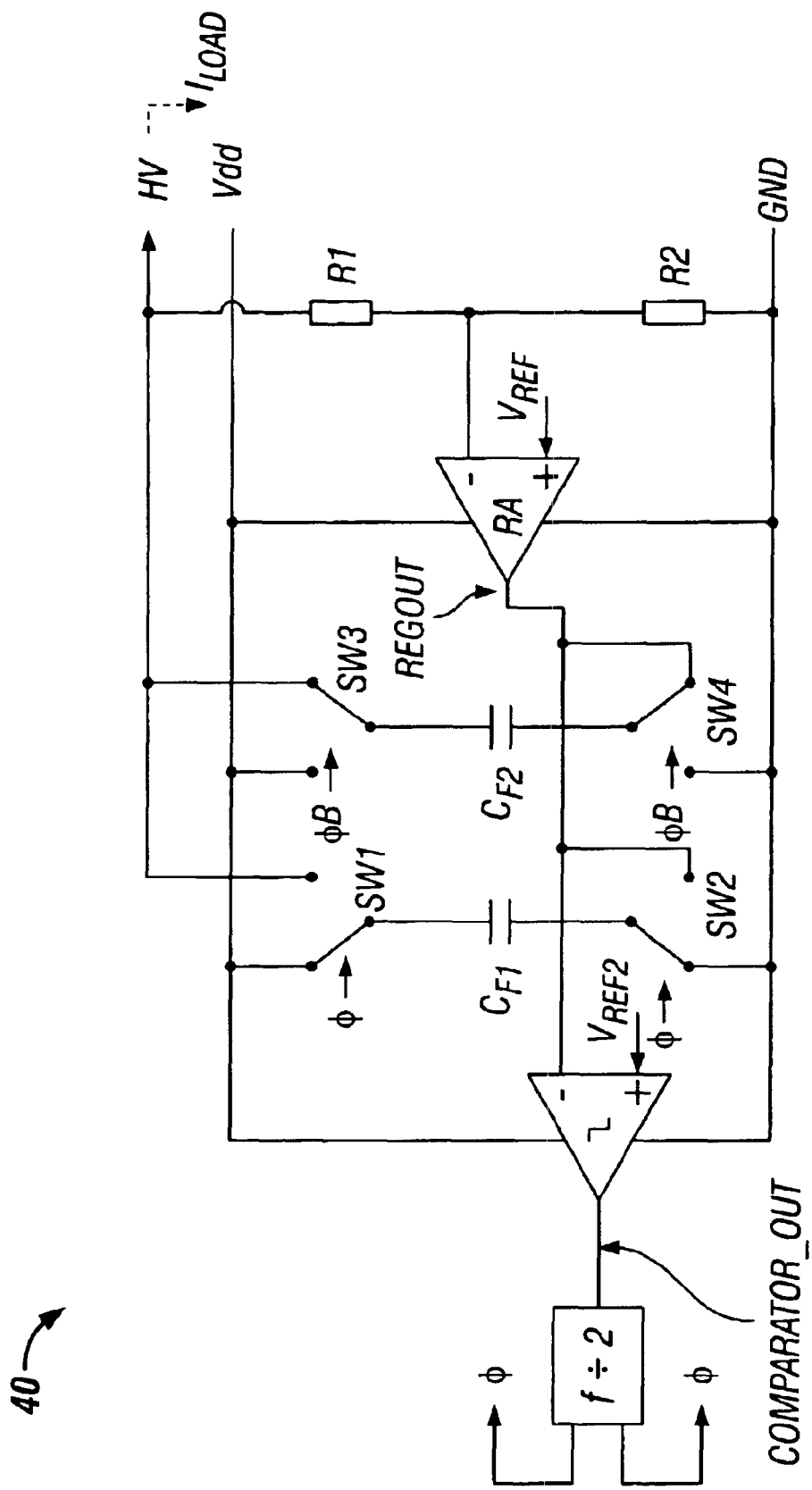

In a second aspect of this invention, a comparator is used in conjunction with the output of the linear loop regulator described above to generate the clock waveforms Φ and ΦB. This system is shown in FIG. 4a. Here, the comparator threshold VREF2 is set to a level just below the supply voltage Vdd, the maximum output voltage of the regulator amplifier RA being Vdd. Hence, as the bottom terminal of the flying capacitor approaches this threshold (FIG. 4b), almost all the usable stored charge in the flying capacitor has been utilized. At this point, a clock signal is generated at the output of the comparator (FIG. 4c) to initiate a switch of the flying capacitors (switches SW1 through SW4 switched by Φ and ΦB—FIG. 4d). Using this scheme, if the threshold of the comparator is set sufficiently below Vdd such that, once the comparator triggers a flying capacitor change, the flying capacitors change before the regulator amplifier RA output saturates at the supply voltage, linear regulation of the charge pump output is maintained. Other techniques could also be used to avoid saturation, such as detecting the onset of saturation and switching before saturation occurs to the extent that an objectionable perturbation occurs in the charge pump output. This could be done, by way of example, by sensing the control terminal of an amplifier output device and switching on detection of an abnormal rate of change in voltage of the control terminal indicative of the loop trying to overdrive the output device to overcome the effects of partial saturation.

This scheme is therefore a predictive scheme. Unlike the prior art, it is not necessary to observe a drop in the charge pump output voltage to initiate a flying capacitor change, so the output ripple can be made extremely small. The clock generator is remarkably simple as it is partially formed by the charge pump structure itself. It has a very wide dynamic clocking range from virtually zero Hz (if no load current is drawn from the output) up to the maximum operating frequency of the comparator, driving logic and regulator. The clocking frequency is continuously and automatically varied depending on the load presented to the charge pump output. Thus in such variable frequency embodiments of the invention, switching losses are dependent on load current, and decrease with decreasing load current to maintain high efficiency independent of load current.

The embodiment of FIG. 4a is not self-starting, and needs some provision for accomplishing start-up. In particular, on start-up, when node HV is at GND, the negative input of the regulator amplifier RA is also at GND. This will force the output REGOUT to go to Vdd. Now if the flying capacitors are changed (switched), they are immediately discharged into node HV, in much the same way as in a conventional charge pump (the bottom plate of the flying capacitors is switched between GND and REGOUT, which is at Vdd— compare with FIG. 2a). Of course, to actually make this pump oscillate, the voltage of node REGOUT must go below the level VREF2 on every capacitor change (as is shown in the waveform of FIG. 4b). This won't happen when HV is low, as the voltage of node REGOUT will remain stuck at Vdd. In one embodiment, an interlock is added in the comparator that 'fools' the comparator into thinking that the voltage of node REGOUT has dropped to GND for a brief period every time the flying capacitors are switched. The time period of this interlock is set to be the maximum rate at which the circuitry of the control loop will run. Therefore, when node HV is at GND, the flying capacitors are switched at the maximum rate at which the circuitry will run to charge the output HV as quickly as possible. Note that even when switching the flying capacitors at the maximum rate, the linear regulation loops will establish and maintain regulation without overshoot by controlling the rate of rise of the voltage of the node REGOUT as required to obtain and maintain a zero differential input to the regulator amplifier. Thus once the node HV is charged to regulation, the comparator may still be 'fooled' into thinking that that node REGOUT has dropped to GND for a brief period every cycle, but when the interlock circuit is switched off, the voltage of node REGOUT actually is below VREF2, so that the comparator will now not switch until required to do so Therefore start-up is fast and the transition to regulation is smooth and automatic without overshoot.

As an alternative start-up strategy, the switches may be switched at any rate up to as high a frequency as they will operate, higher than the response of the rest of the loop, such as by an external oscillator signal. Since the output of the regulator amplifier will be high during start-up, using as high a switching frequency as possible will pump charge to the charge pump output as fast as possible, providing a very rapid start-up. Some overshoot may occur, however, before the regulator amplifier responds to the charge pump output reaching the desired output voltage.

It should be noted that in many circuits, oscillatory or not, some form of start-up circuit or procedure is required to avoid prohibited or undesired states and to establish normal operation sequences. Consequently, the choice and design of such circuits is well within the skill of one of ordinary skill in the art, as there are many ways of achieving the same outcome (i.e., the circuit starts up).

Figure 5A:
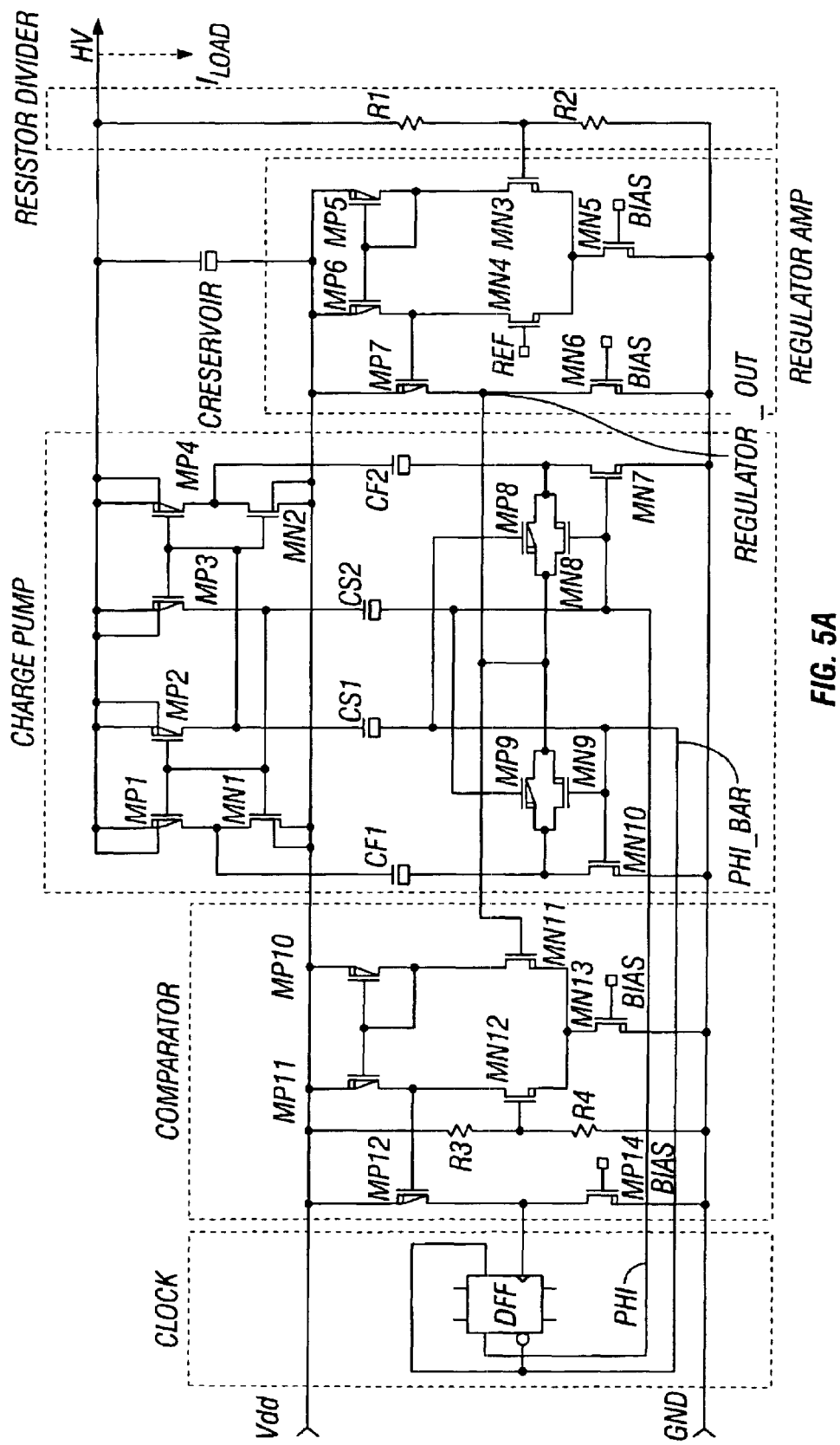

FIG. 5a shows a preferred embodiment of the whole pump system. Those skilled in the art will recognize that the charge pump structure, regulator amplifier structure, comparator structure, clock generator structure and so on can be replaced with many different functionally similar blocks well known in the art. This embodiment does not represent the only possible implementation of the invention, but rather simply an exemplary implementation.

The operation of the circuit is as follows. Transistors MP1, MN1 form the switching devices for the top of flying capacitor CF1. Similarly transistors MP4 and MN2 form the switching devices for flying capacitor CF2. Capacitors CS1 and CS2 are boost capacitors of very much smaller value than flying CF1 and CF2, and together with charging devices MP2 and MP3, allow the above mentioned top flying capacitor switches to be switched on and off using a control voltage with maximum excursion of GND to Vdd (the signals PHI and PHI_BAR). Transistor MN10 is used to connect the bottom of capacitor CF1 to GND when in the charge phase, and transistors MP9 and MN9 form a transmission gate to connect the bottom of capacitor CF1 to the output of the regulator amplifier when in the active state. Transistors MP8, MN8 and MN7 perform the same operation for flying capacitor CF2. The above-described devices (bounded by the box labeled charge pump in FIG. 5a) will be readily recognized as an implementation of the capacitor and switch function shown in FIG. 4a, though the present invention is not limited to only that one capacitor and switch configuration, as others may be used as desired.

The high voltage output node, HV, is divided by resistors R1 and R2 such that the level of the output HV (which is at a greater potential than Vdd) can be compared with a reference signal that is less than Vdd. The regulator amplifier is formed by transistors MP5 to MP7 and MN3 to MN6, although it should be recognized that generally MN6 is not required, as the bottom of the flying capacitors CF1 and CF2 normally will only be elevated toward Vdd during regulation. However, charge introduced to node HV by either the load or charge injection from the switches can be countered by inclusion of a pull-down device, such as transistor MN6, if desired. Similarly, $C_{RESERVOIR}$ is shown, although, as discussed above, often this may be omitted.

The output of the regulator amplifier, REGULATOR_OUT, feeds (via the transmission gates MP9/MN9 and MP8/MN8) the bottom of the flying capacitors CF1 and CF2. Again, this will be readily recognized as an implementation of the regulator and charge pump arrangement of FIG. 4a.

Transistors MP10 to MP12 and MN11 to MN14 form the clock driver comparator. The threshold level for this comparator is set by resistors R3 and R4 as (Vdd)(R4)/(R3+R4), where typically R3<<R4, such that the comparator threshold is close to Vdd. Referring to the waveforms shown in FIGS. 5b and 5c, the comparator output is switched to GND when REGULATOR_OUT is greater than the threshold voltage, and switches to Vdd when REGULATOR_OUT is below the comparator threshold.

The comparator is followed by a D-type flip-flop (DFF) based divide by two circuit, using a negative edge triggered device (many other circuit implementations may be used if desired). This results in the signals PHI and PHI_BAR being inverted every time the comparator output goes low, i.e., every time REGULATOR_OUT approaches Vdd. As PHI and PHI_BAR are inverted, the charge pump switches between the states of flying capacitor CF1 being connected between Vdd and GND (the charge state) and flying capacitor CF2 being connected between HV and REGULATOR_OUT (the active state), to flying capacitor CF2 in the charge state and flying capacitor CF1 in the active state. This alternating of the flying capacitors CF1 and CF2 between active and charge is thus continuous, the rate of oscillation being controlled by how fast the node REGULATOR_OUT moves between the voltage $V_x$ and the comparator threshold, which in turn is a direct representation of how much current is being drawn from the node HV. In the waveforms shown in FIGS. 5b and 5c, the response of the charge pump system to step changes in load current is illustrated.

It should be noted that in the present invention, the aspect comprising the linear regulator loops is independent of the aspect of the predictive clocking scheme, in that the linear regulator aspect will function equally well with a fixed frequency clock. In that case, the percentage that each capacitor will be discharged in the active state before being switched to the charge state will be proportional to the load current, including any current required by the voltage divider on the output. In other applications, one might choose to limit the lowest frequency of operation of the charge pump to limit the lowest frequency of the switching perturbations in the charge pump for filtering reasons, or to keep the frequency of such perturbations out of the frequency range of interest, such as the audio frequency range or some other frequency range. Thus at low loads, the charge pump would operate at the fixed low frequency, but have the capability of operating at higher frequencies for higher load currents, up to its maximum frequency and load current when necessary. One might also choose to operate on a clock having a predetermined high frequency and one or more predetermined lower frequencies, and to switch the clock to the high frequency for load currents approaching the maximum for the charge pump, and to a lower frequency for lesser load currents to reduce switching losses when not needed, yet still avoid in-between frequencies that might be troublesome with other circuits being powered by the charge pump, such as might cause beat frequencies and the like. All of the foregoing variations would be self-starting, though not all at the maximum rate otherwise possible. These and other variations, and various circuits for accomplishing such operation, will be obvious to those skilled in the art.

The present invention provides a new approach to charge pump regulation that allows regulation of the pump output right up to the maximum voltage of the process—i.e. it has no dropout requirement. It also has no output droop with increasing load current, and does not have the ripple associated with many prior art pumps. The invention allows (but is not limited to) variable-frequency self-clocking of the charge pump, automatically adjusting for increases in load current without monitoring for output voltage degradation, thereby leading to a low output ripple for varying loads and very high efficiency under varying load conditions.

In the embodiments of the invention so far disclosed herein for exemplary purposes, a resistor voltage divider has been illustrated for dividing the high voltage output HV to a voltage below Vdd for input to the differential regulator amplifier RA having the second input coupled to a reference voltage REF. However, like other parts of the disclosed embodiments, the specific circuit disclosed, a resistor voltage divider, may be replaced by any of many other circuits, active or passive, and whether or not they comprise a true divider circuit. By way of example, an equivalent function may be achieved by comparing, at a current summing point, a reference current to a current fed back from a resistor coupled to the output voltage HV, with the difference current being coupled to the equivalent of a second stage of a common differential amplifier.

Figure 6:
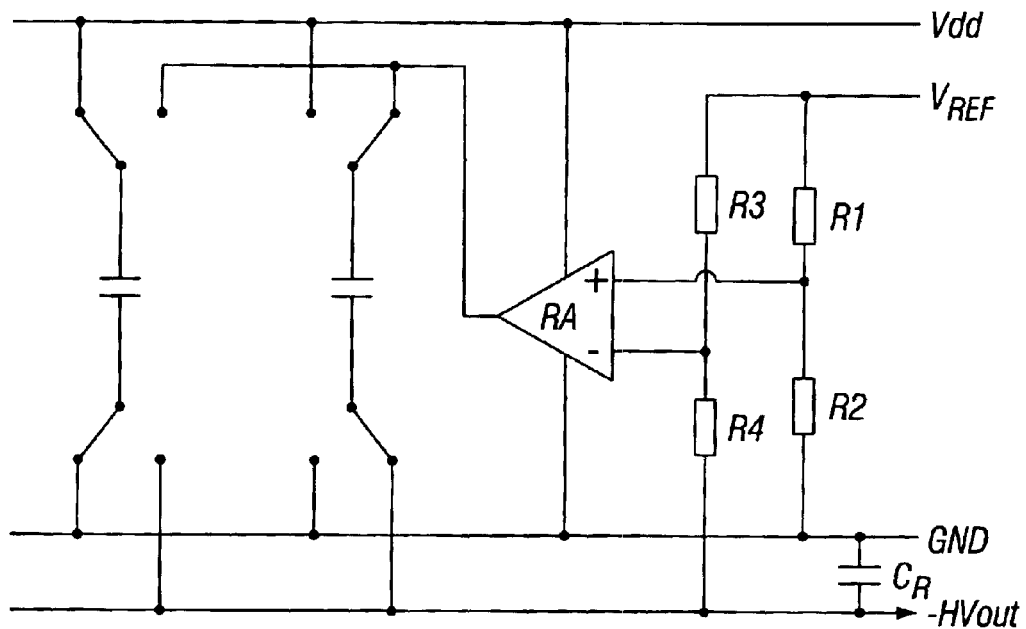
FIG. 6 is a circuit diagram illustrating a charge pump in accordance with the present invention for providing a negative regulated voltage output.

Now referring to FIG. 6, a circuit diagram illustrating a charge pump in accordance with the present invention for providing a negative regulated voltage output may be seen. The circuit is similar to that of FIG. 3a though the polarity of the flying capacitors when switched between the output of the regulator amplifier RA and the output HV is reversed. This causes the output to be a negative voltage (Hvout is below GND). Also the resistor network is more complicated that the simple voltage divider of FIG. 3a, though the resistor network is exemplary only, as the function may be achieved various ways. The output voltage HV out is given by the equation:

$$HVout = V_{reg}\left(1 - \frac{R1(R3+R4)}{R3(R1+R2)}\right)$$

(The foregoing equation will yield a negative value if (R1)(R4) is larger than (R2)(R3)).

Figure 7:
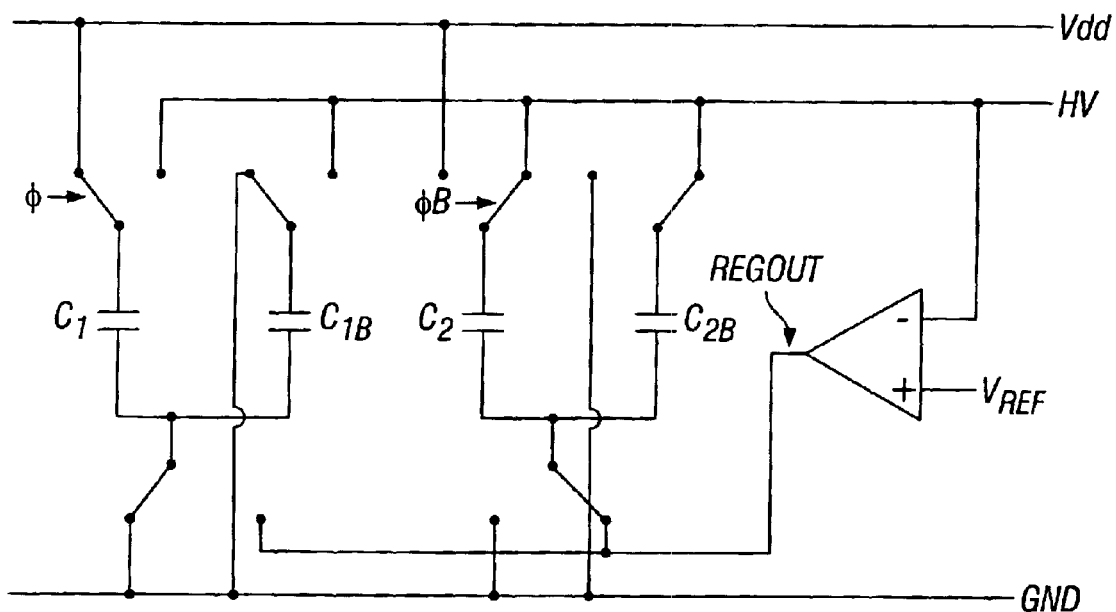
FIG. 7 is a circuit diagram illustrating a charge pump in accordance with the present invention for providing a regulated voltage output that is lower than the power supply voltage.

FIG. 7 is a circuit diagram illustrating a charge pump in accordance with the present invention for providing a regulated voltage output that is lower than the power supply voltage. Here, $C_1$ charges to Vdd and $C_{1B}$ is grounded (both terminals). When Φ switches, $C_1$ and $C_{1B}$ charge-share such that the voltage across the pair of capacitors is less than HV. Regulation then proceeds as before, but in this case, REGOUT can go higher than HV, resulting in a very efficient pump, as REGOUT can be made to swing fully from GND to Vdd each cycle if:

$$\frac{C_1 Vdd}{C_1 + C_{1B}} \approx HV$$

Figure 8:
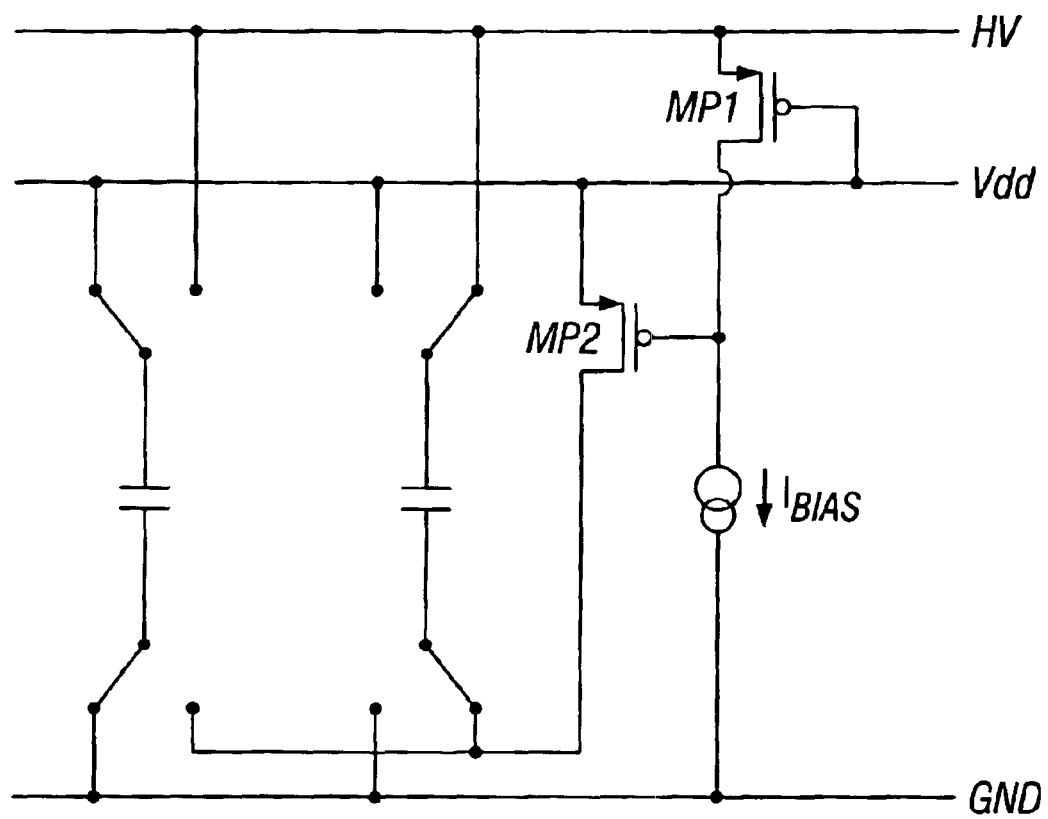
FIG. 8 is a circuit diagram illustrating a charge pump in accordance with the present invention for providing a voltage output that is level shifted upward from the power supply voltage.

Note the direct sensing of the node HV (no voltage divider or other input circuit), with HV=Vreg. FIG. 8 is a circuit diagram illustrating a charge pump in accordance with the present invention for providing a voltage output that is level shifted upward from the power supply voltage, specifically by the threshold of transistor MP1 (HV=Vdd+$Vgs_{MP1}$). Note that transistor MP1, biased by current source $I_{Bias}$, acts as a single-ended amplifier (no voltage divider or equivalent needed).

In the embodiments of FIGS. 3a, 4a, 5a, 6 and 7, the reference voltage may be a fixed or regulated voltage, a voltage that varies in response to some parameter, or it could be part of some larger or different closed loop, such as responsive to some parameter of a device or circuit powered by the charge pump. The reference voltage also could be a power supply voltage, such as Vdd or proportional to Vdd, so that HV is proportional to Vdd.

While certain preferred embodiments of the present invention have been disclosed herein, such disclosure is only for purposes of understanding the exemplary embodiments and not by way of limitation of the invention. It will be obvious to those skilled in the art that various changes in form and detail may be made in the invention without departing from the spirit and scope of the invention as set out in the full scope of the following claims.

What is claimed is:

1. In a charge pump having first and second flying capacitors and providing a regulated charge pump output, a method of pumping charge comprising:
   providing a first signal responsive to the difference between a feedback signal from the charge pump output and a reference; and,
   alternately switching between:
   a) coupling the first flying capacitor between first and second power supply terminals, and coupling the second flying capacitor between the first signal and the charge pump output; and,
   b) coupling the second flying capacitor between first and second power supply terminals, and coupling the first flying capacitor between the first signal and the charge pump output;
   the charge pump output, the first signal and the voltage on the flying capacitor coupled between the first signal and the charge pump output forming a continuous linear regulation loop.

2. The method of claim 1 wherein the first signal is provided by an amplifier, and the switching is done before the amplifier saturates.

3. The method of claim 2 wherein the switching occurs when the output of the amplifier reaches a voltage a predetermined increment away from saturation.

4. The method of claim 2 wherein the switching is done when the output of the amplifier reaches a predetermined voltage.

5. The method of claim 4 wherein the output of the amplifier is compared with a second reference, and wherein the switching is controlled by the complimentary change of state of a circuit triggered by a pulse resulting from a predetermined change of state of the comparison.

6. The method of claim 4 further comprising starting the charge pump by forcing the switching to occur.

7. The method of claim 4 further comprising starting the charge pump by forcing the switching to occur at the maximum rate the charge pump will operate.

8. The method of claim 4 further comprising starting the charge pump by forcing the switching to occur at any rate up to the maximum rate the switching may be accomplished.

9. The method of claim 2 wherein the amplifier is a differential amplifier and one input to the differential amplifier is coupled to a reference voltage.

10. The method of claim 1 wherein the reference voltage is a power supply voltage.

11. The method of claim 1 wherein the reference voltage is proportional to a power supply voltage.

12. The method of claim 1 wherein the switching occurs at a fixed frequency.

13. The method of claim 1 wherein the feedback signal is obtained from a voltage divider coupled between the charge pump output and the first power supply terminal.

14. The method of claim 1 wherein the feedback signal is obtained by level shifting the charge pump output.

15. A charge pump comprising:
   first and second flying capacitors;
   an amplifier;
   a plurality of switches;
   the amplifier being coupled to provide an output responsive to the difference between a voltage responsive to an output voltage of the charge pump and a reference;
   the switches being coupled to alternately switch between:
   a) coupling the first flying capacitor between first and second power supply terminals, and coupling the second flying capacitor between the amplifier output and the charge pump output; and,
   b) coupling the second flying capacitor between first and second power supply terminals, and coupling the first flying capacitor between the amplifier output and the charge pump output.

16. The charge pump of claim 15 further comprised of switch control circuitry causing the alternating switching before the amplifier reaches saturation.

17. The charge pump of claim 16 wherein the switch control circuitry comprises a comparator coupled to compare the output of the amplifier to a second reference, an output of the comparator pulsing a divide by two circuit, the output of the divide by two circuit controlling the plurality of switches.

18. The charge pump circuit of claim 17 wherein the divide by two circuit is a D flip-flop.

19. The charge pump of claim 15 wherein the switches are MOS transistor switches.

20. The charge pump of claim 15 wherein the amplifier is a differential amplifier.

21. The charge pump of claim 20 further comprising a voltage divider coupled to feed back the output voltage of the charge pump to the differential amplifier.

22. The charge pump of claim 15 wherein the reference is a power supply voltage.

23. The charge pump of claim 15 wherein the reference is proportional to a power supply voltage.

24. The charge pump of claim 15 wherein the output of the charge pump is a level shifted charge pump output.

25. A charge pump comprising:

first and second flying capacitors;

an amplifier;

a plurality of switches;

the amplifier being coupled to provide an output responsive to an output voltage of the charge pump;

the switches being coupled to alternately switch between:
a) coupling the first flying capacitor between first and second power supply terminals, and coupling the second flying capacitor between the amplifier output and the charge pump output; and,
b) coupling the second flying capacitor between first and second power supply terminals, and coupling the first flying capacitor between the amplifier output and the charge pump output.

26. The charge pump of claim 25 further comprised of switch control circuitry causing the alternating switching before the amplifier reaches saturation.

27. The charge pump of claim 26 wherein the switch control circuitry comprises a comparator coupled to compare the output of the amplifier to a reference, an output of the comparator pulsing a divide by two circuit, the output of the divide by two circuit controlling the plurality of switches.

28. The charge pump circuit of claim 27 wherein the divide by two circuit is a D flip-flop.

29. The charge pump of claim 25 wherein the switches are MOS transistor switches.

30. The charge pump of claim 25 wherein the amplifier is a differential amplifier having an input coupled to a reference.

31. The charge pump of claim 30 further comprising a voltage divider coupled to feed back the output voltage of the charge pump to the differential amplifier.

32. The charge pump of claim 30 wherein the reference is a power supply voltage.

33. The charge pump of claim 30 wherein the reference is proportional to a power supply voltage.

34. The charge pump of claim 25 wherein the output of the charge pump is a level shifted charge pump output.

* * * * *